United States Patent
Kadrager et al.

(10) Patent No.: US 12,532,089 B2
(45) Date of Patent: Jan. 20, 2026

(54) GLOBAL SHUTTER IMAGE SENSOR WITH PARASITIC LIGHT LEAKAGE CORRECTION

(71) Applicant: SEMICONDUCTOR COMPONENTS INDUSTRIES, LLC, Scottsdale, AZ (US)

(72) Inventors: Karishmae Kadrager, Meridian, ID (US); Kyle Thomas, San Francisco, CA (US); Radu Ispasoiu, Saratoga, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 44 days.

(21) Appl. No.: 18/756,398

(22) Filed: Jun. 27, 2024

(65) Prior Publication Data

US 2026/0006347 A1   Jan. 1, 2026

(51) Int. Cl.
*H04N 25/532* (2023.01)
*H04N 25/621* (2023.01)
*H04N 25/77* (2023.01)

(52) U.S. Cl.
CPC ......... *H04N 25/532* (2023.01); *H04N 25/621* (2023.01); *H04N 25/77* (2023.01)

(58) Field of Classification Search
CPC ..... H04N 25/532; H04N 25/621; H04N 25/77
USPC ........................................................ 348/308
See application file for complete search history.

(56) References Cited

U.S. PATENT DOCUMENTS

| | | | | |
|---|---|---|---|---|
| 8,089,036 | B2* | 1/2012 | Manabe | H10F 39/803 |
| | | | | 250/214 R |
| 10,791,292 | B1* | 9/2020 | Geurts | H04N 25/771 |
| 2017/0163912 | A1* | 6/2017 | Zhan | H04N 25/771 |
| 2018/0055464 | A1* | 3/2018 | Watanabe | H04N 25/30 |
| 2018/0091748 | A1* | 3/2018 | Yan | H04N 25/78 |
| 2019/0324156 | A1* | 10/2019 | Miura | A61B 6/4233 |
| 2021/0289157 | A1* | 9/2021 | Ha | H10F 39/153 |
| 2022/0286640 | A1* | 9/2022 | Cowley | H10F 39/18 |
| 2023/0040144 | A1* | 2/2023 | Tadmor | H04N 23/60 |

OTHER PUBLICATIONS

Marcelot, Olivier, et al., "Mitigation of Parasitic Light Sensitivity in Global Shutter CMOS Image Sensors Through Use of Correction Frame", Transactions on Electron Devices, vol. 68, No. 9, Sep. 2021, 6 pages, doi: 10.1109/TED.2021.3099451.

* cited by examiner

*Primary Examiner* — Lin Ye
*Assistant Examiner* — Chan T Nguyen
(74) *Attorney, Agent, or Firm* — Dickinson Wright PLLC; Jonathan A. Schnayer (57) ABSTRACT

Global shutter image sensors, imaging systems, and methods for operating global shutter image sensor. The global shutter image sensor includes a pixel array and a controller. The pixel array includes a correction pixel and a plurality of image pixels positioned around the correction pixel. The correction pixel and each of the plurality of image pixels include a photodetector, a storage diode, and a frame transfer transistor. The photodetector is configured to accumulate charge in response to incident light. The frame transfer transistor is coupled between the photodetector and the storage diode. The first row driver coupled to the frame transfer transistor in each of the plurality of image pixels. The second row driver coupled to the frame transfer transistor in the correction pixel.

20 Claims, 7 Drawing Sheets

GLOBAL SHUTTER IMAGE SENSOR WITH PARASITIC LIGHT LEAKAGE CORRECTION

BACKGROUND

Image sensors are used in electronic devices such as cellular telephones, cameras, and computers to capture images. In particular, an electronic device is provided with an array of pixels arranged in a grid pattern. Each pixel receives incident photons, such as light, and converts the photons into electrical signals. Column circuitry is coupled to each column of the array for reading out sensor signals from each pixel.

SUMMARY

All pixels in a global shutter image sensor capture an image simultaneously in order to avoid motion artifacts. However, pixels are read out row by row. Thus, unwanted charge may be collected in the storage diode of the pixels due to light leakage while the pixels are waiting to be read out. Ghost or motion artifacts may be observed in global shutter images due to storage diode light leakage. Thus, the present disclosure provides image sensors, imaging systems, and methods that, among other things, determine localized storage diode light leakage to correct for parasitic leakage in global shutter imaging.

The present disclosure provides a global shutter image sensor including, in one implementation, a pixel array and a controller. The pixel array includes a correction pixel and a plurality of image pixels positioned around the correction pixel. The correction pixel and each of the plurality of image pixels include a photodetector, a storage diode, and a frame transfer transistor. The photodetector is configured to accumulate charge in response to incident light. The frame transfer transistor is coupled between the photodetector and the storage diode. The first row driver coupled to the frame transfer transistor in each of the plurality of image pixels. The second row driver coupled to the frame transfer transistor in the correction pixel.

The present disclosure also provides an imaging system including, in one implementation, a lens system, a global shutter image sensor, and an imaging controller. The global shutter image sensor is in operational relationship with the lens system. The global shutter image sensor includes a pixel array with a correction pixel and a plurality of image pixels. The correction pixel and each of the plurality of image pixels include a photodetector, a storage diode, and a frame transfer transistor coupled between the photodetector and the storage diode. The frame transfer transistor in each of the plurality of image pixels is made conductive when a first frame transfer control signal is asserted. The frame transfer transistor in the correction pixel is made conductive when a second frame transfer control signal is asserted. The imaging controller is configured to reset the pixel array. The imaging controller is also configured to arrange the pixel array to be sensitive to incident light for an integration time, resulting in a charge generated at each pixel of the pixel array. The imaging controller is further configured to generate a first frame transfer control signal after the integration time to cause storage of the generated charge in the plurality of image pixels. The imaging controller is also configured to read out a noise signal from the correction pixel while keeping a second frame transfer control signal unasserted after the pixel array is reset. The assertion of the second frame transfer control signal causes storage of the generated charge in the correction pixel. The imaging controller is further configured to read out image signals from each of the plurality of image pixels. The imaging controller is also configured to determine pixel values for each of the plurality of image pixels based on the image signals and the noise signal.

The present disclosure further provides a method for operating a global shutter image sensor. The global shutter image sensor includes a correction pixel and a plurality of image pixels positioned around the correction pixel in a pixel array. The correction pixel and each of the plurality of image pixels include a photodetector, a storage diode, and a frame transfer transistor coupled between the photodetector and the storage diode. The frame transfer transistor in each of the plurality of image pixels is made conductive when a first frame transfer control signal is asserted. The frame transfer transistor in the correction pixel is made conductive when a second frame transfer control signal is asserted. The method includes resetting the pixel array. The method also includes arranging the pixel array to be sensitive to incident light for an integration time, resulting in a charge generated at each pixel of the pixel array. The method further includes asserting the first frame transfer control signal after the integration time to cause storage of the generated charge in the plurality of image pixels. The method also includes reading out a noise signal from the correction pixel while keeping a second frame transfer control signal after the pixel array is reset. The assertion of the second frame transfer control signal causes storage of the generated charge in the correction pixel. The method further includes reading out image signals from each of the plurality of image pixels. The method also includes determining pixel values for each of the plurality of image pixels based on the image signals and the noise signal.

BRIEF DESCRIPTION OF THE DRAWINGS

For a detailed description of example implementations, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

In relation to a "frame transfer control signal," the terms "first" and "second" may only be used herein to distinguish one control signal from another control signal. The terms "first" and "second," when used herein in relation to a "frame transfer control signal," do not imply a requirement of two frames.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to systems and methods that correct for storage diode parasitic leakage in global shutter imaging. More particularly, various examples are directed to global shutter image sensors with correction pixels for determining localized storage diode light leakage to correct for parasitic leakage. More particularly still, various examples are directed to global shutter imaging systems and related controllers that prevent frame transfer in correction pixels so that the correction pixels readout localized values of storage diode light leakage. The specification now turns to an example system to orient the reader.

Figure 1A:
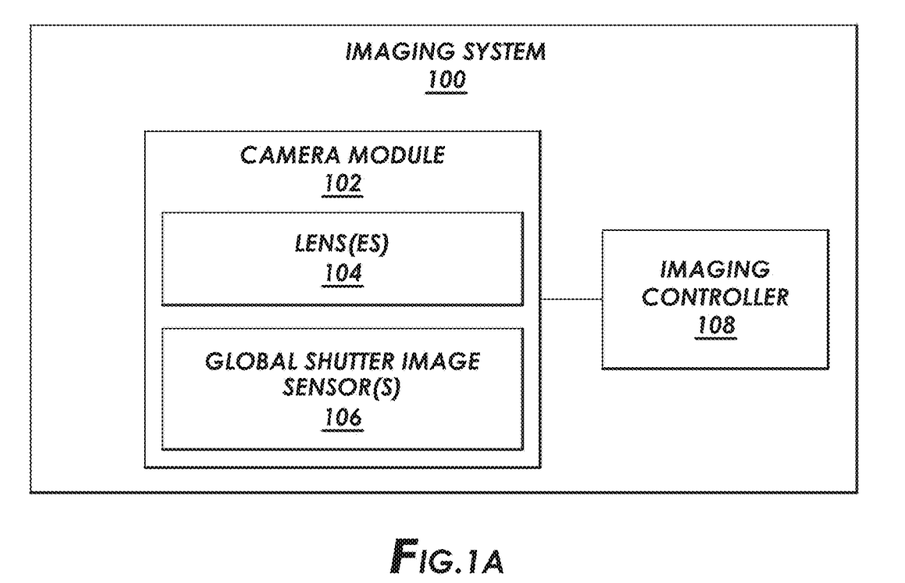
FIG. 1A is a block diagram of an example of an imaging system in accordance with some implementations.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data. The camera module 102 may include one or more lenses 104 and one or more corresponding global shutter image sensors 106. The lenses 104 may include fixed and/or adjustable lenses. During image capture operations, light from a scene may be focused onto the global shutter image sensor 106 by the lenses 104. The global shutter image sensor 106 may comprise circuitry for converting analog pixel data into corresponding digital image data to be provided to the imaging controller 108. If desired, the camera module 102 may be provided with an array of lenses 104 and an array of corresponding global shutter image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the global shutter image sensor 106. Digital image data captured by the camera module 102 may be processed and stored using the imaging controller 108. Processed image data may, if desired, be provided to external equipment, such as a computer, external display, or other device, using wired and/or wireless communications paths coupled to the imaging controller 108.

Figure 1B:
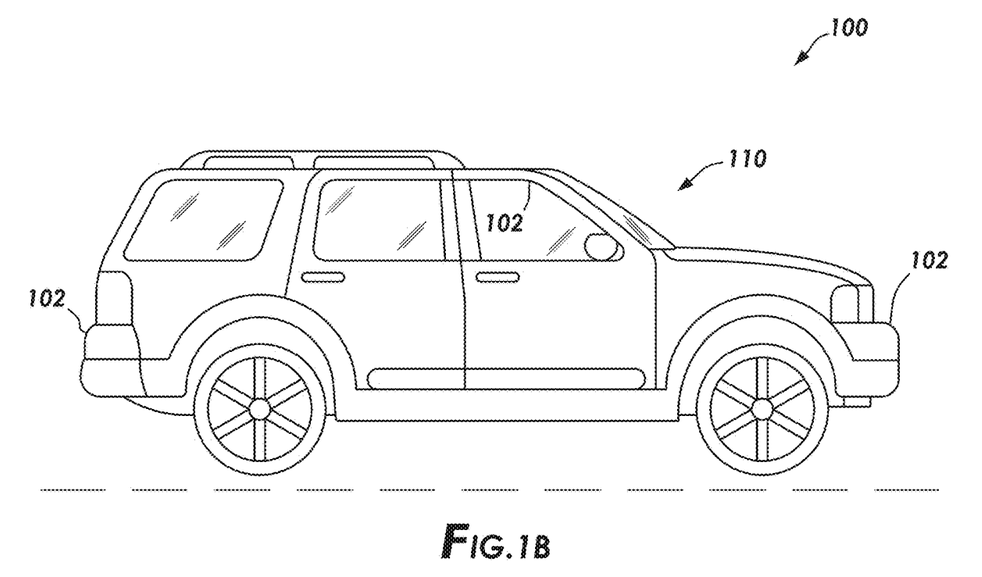
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking cameral module 102 arranged to capture images of scenes in front of the vehicle 110. Such a forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such a backward-looking camera module 102 can be used for any suitable purpose, such as collision warning systems, reverse direction video, autonomous driving systems, proximity detection, monitoring position of overtaking vehicles, and backing up. The vehicle 110 further comprises a side-looking camera module 102 arranged to capture images of scenes beside the vehicle 110. Such a side-looking camera module 102 can be used for any suitable purpose, such as blind-spot monitoring, collision warning systems, autonomous driving systems, monitoring position of overtaking vehicles, lane-change detection, and proximity detection. In situations in which the imaging system 100 is a vehicle, the imaging controller 108 may be a controller of the vehicle 110. The discussion now turns in greater detail to the global shutter image sensor 106 of the camera module 102.

Figure 2:
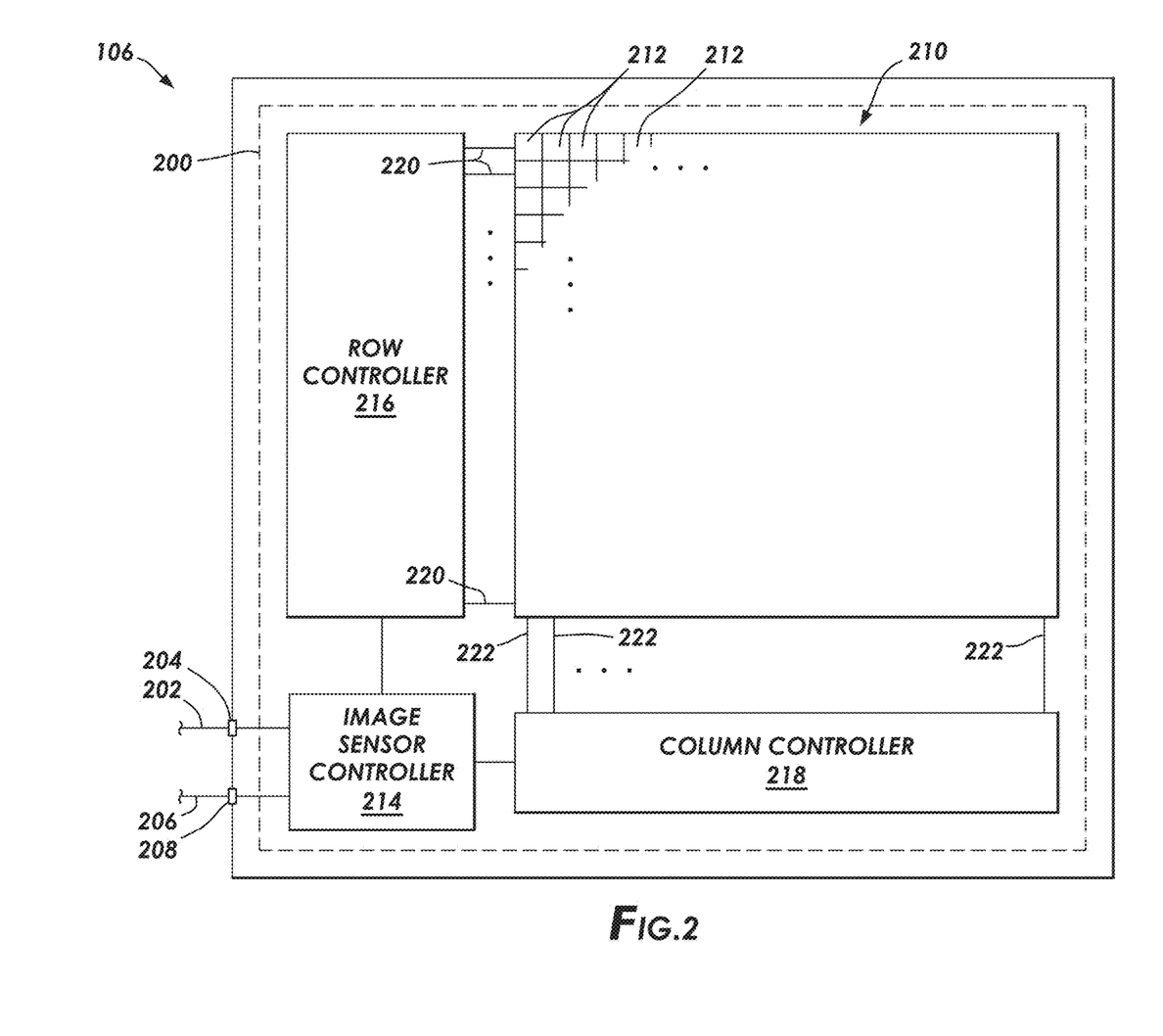
FIG. 2 is a partial schematic and a partial block diagram of an example of a global shutter image sensor in accordance with some implementations.

FIG. 2 shows an example of the global shutter image sensor 106. In particular, FIG. 2 shows that the global shutter image sensor 106 may comprise a substrate 200 of semiconductor material, such as silicon, encapsulated within packaging to create a packaged semiconductor device or packaged semiconductor product. Bond pads or other connection points of the substrate 200 couple to terminals of the global shutter image sensor 106, such as a serial communication channel 202 coupled to a first terminal 204, and a capture input 206 coupled to a second terminal 208. Additional terminals will be present, such as ground, common, or power, but the additional terminals are omitted so as not to unduly complicate the figure. While a single instance of the substrate 200 is shown, in other implementations, multiple substrates may be combined to form the global shutter image sensor 106 in a multi-chip module.

The global shutter image sensor 106 illustrated in FIG. 2 includes a pixel array 210 with a plurality of pixels 212 arranged in rows and columns. The pixel array 210, being one example of an "array of pixels," may include, for example, hundreds or thousands of rows and columns of pixels 212. Control and readout of the pixel array 210 may be implemented by an image sensor controller 214 coupled to a row controller 216 and a column controller 218. The row controller 216 may receive row addresses from the image sensor controller 214 and supply corresponding row control signals to the pixels 212, such as reset, frame transfer, readout transfer, row select, and anti-blooming control signals. The row control signals may be communicated over one or more conductors, such as row control paths 220.

The column controller 218 may be coupled to the pixel array 210 by way of one or more conductors, such as column lines 222. Column controllers may sometimes be referred to as column control circuits, readout circuit, or column decoders. The column lines 222 may be used for reading out pixel signals from the pixels 212 and for supplying bias currents and/or bias voltages to the pixels 212. If desired, during pixel readout operations, a pixel row in the pixel array 210 may be selected using the row controller 216 and pixel signals generated by the pixels 212 in that pixel row can be read out along the column lines 222. The column controller 218 may include sample-and-hold circuitry for sampling and temporarily storing pixel signals readout from the pixel array 210, amplifier circuitry, analog-to-digital conversion (ADC) circuitry, bias circuitry, column memory, latch circuitry for selectively enabling or disabling the column circuitry, or other circuitry that is coupled to one or more columns of the pixels 212 in the pixel array 210 for operating the pixels 212 and for reading out pixel signals from the pixels 212. ADC circuitry in the column controller 218 may convert analog pixel values received from the pixel array 210 into corresponding digital image data. The column controller 218 may supply digital image data to the image sensor controller 214 and/or the imaging controller 108 (FIG. 1A) over, for example, the serial communication channel 202.

Figure 3:
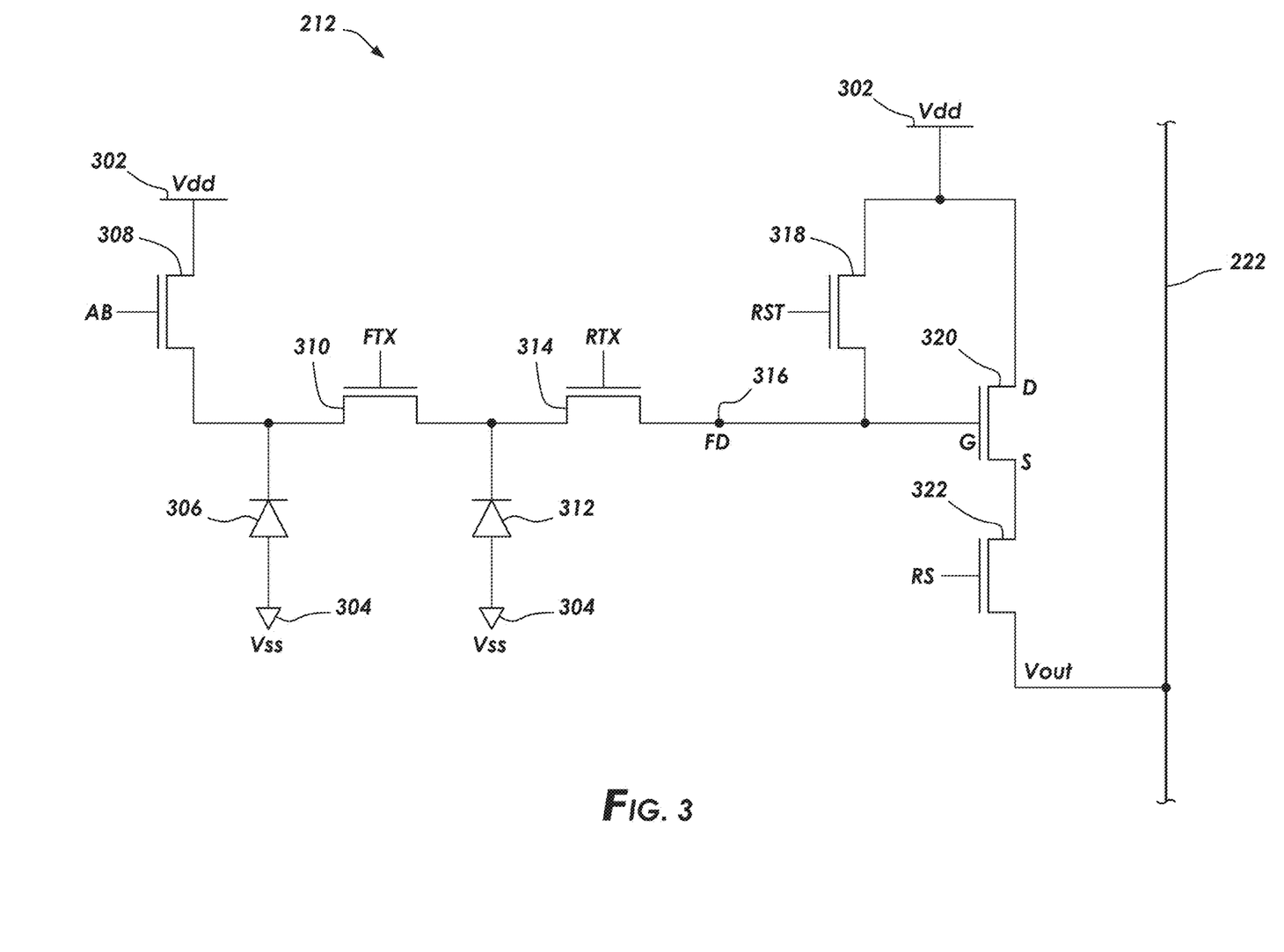
FIG. 3 is a schematic of an example of circuitry in a pixel of the global shutter image sensor of FIG. 2 in accordance with some implementations.

FIG. 3 shows an example of circuitry in one of the pixels 212 in the pixel array 210. In particular, FIG. 3 shows that each of the pixels 212 may comprise a positive power supply terminal 302, a ground terminal 304, a photodetector 306 in the example form of a photodiode, an anti-blooming transistor 308, a frame transfer transistor 310, a storage diode 312, a readout transfer transistor 314, a floating diffusion (FD) 316, a reset transistor 318, a source-follower transistor 320, and a row select transistor 322. Each of the pixels 212 in the pixel array 210 may include fewer components, additional components, or different components in different configurations than the one illustrated in FIG. 3. A positive pixel power supply voltage, such as supply voltage Vdd, may be supplied at the positive power supply terminal 302. A ground power supply voltage, such as reference voltage Vss, may be supplied at the ground terminal 304. Incoming light is gathered by the photodetector 306, in some cases after the light passes through a color filter structure (not shown). The photodetector 306 converts the light to electrical charge. The storage diode 312 exhibits a capacitance that can be used to store charge that has been transferred from the photodetector 306. In FIG. 3, the anti-blooming transistor 308 selectively connects the photodetector 306 to the positive power supply terminal 302. In other implementations, the anti-blooming transistor 308 may selectively connect the photodetector 306 to a different power supply terminal (not shown). The frame transfer transistor 310 selectively connects the photodetector 306 to the storage diode 312. The readout transfer transistor 314 selectively connects the storage diode 312 to the floating diffusion 316. The reset transistor 318 selectively connects the floating diffusion 316 to the positive power supply terminal 302. A signal associated with charge stored in the floating diffusion 316 is buffered by the source-follower transistor 320. The row select transistor 322 selectively connects the source-follower transistor 320 to one of the column lines 222.

Figure 4:
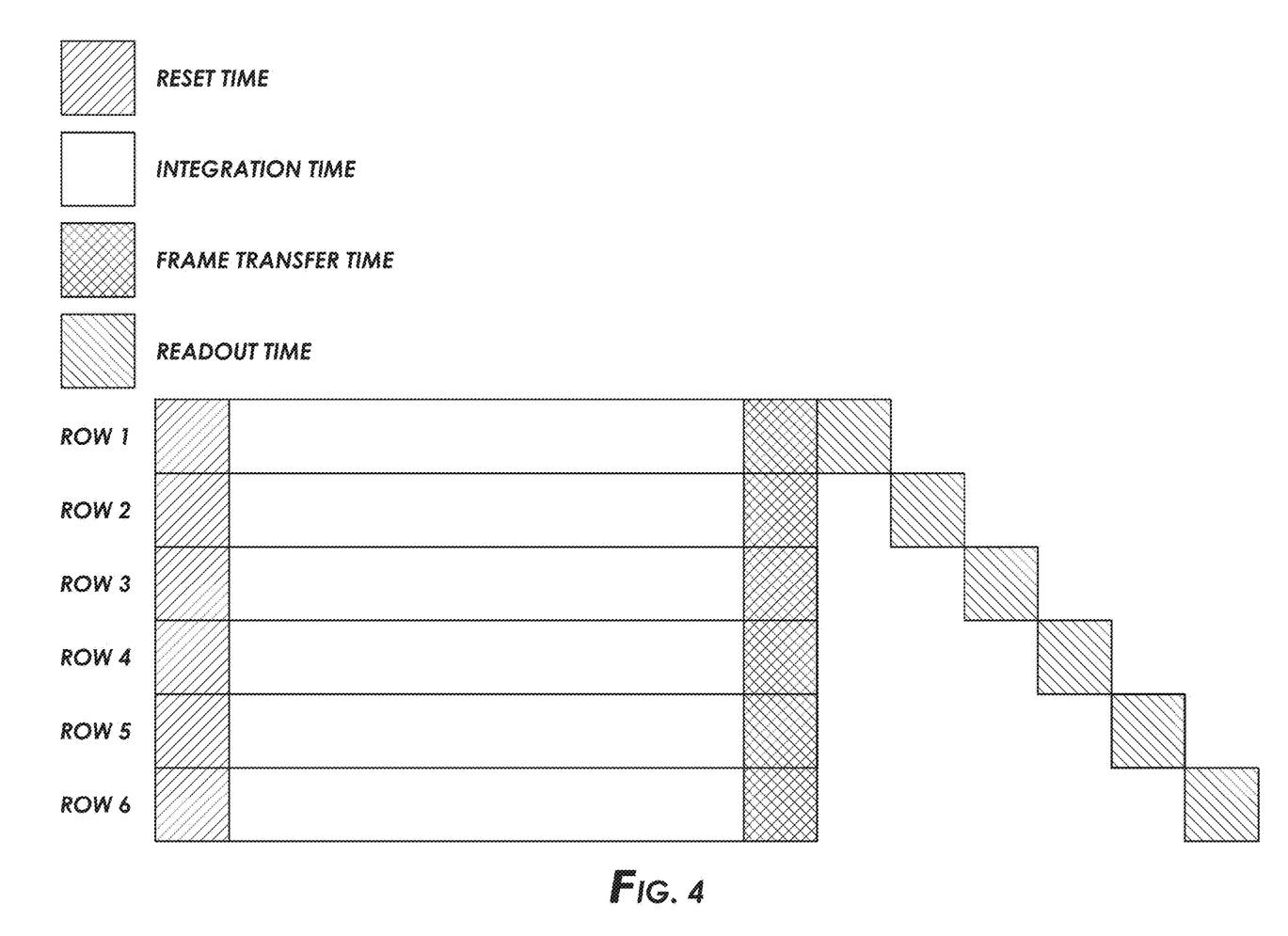
FIG. 4 is a timing diagram of an example of imaging performed by the global shutter image sensor of FIG. 2 in accordance with some implementations.

FIG. 4 is a timing diagram of imaging performed by the global shutter image sensor 106. For simplicity of explanation, the timing diagram is depicted in FIG. 4 and described below in relation to an implementation of the pixel array 210 that includes six rows. However, the timing diagram can be adjusted to depict the operation of other implementations of the pixel array 210 that include more than six rows or less than six rows. During the reset time, an anti-blooming control signal AB is asserted. As illustrated in FIG. 3, the anti-blooming control signal AB is applied to the gate terminal of the anti-blooming transistor 308. When the anti-blooming control signal AB is asserted, the anti-blooming transistor 308 is made conductive to reset the photodetector 306 to a voltage equal or close to the supply voltage Vdd. The anti-blooming control signal AB is then de-asserted to turn off the anti-blooming transistor 308. During the integration time, the photodetector 306 generates charge in response to incoming light. During the frame transfer time, the charge collected in the photodetector 306 is transferred to the storage diode 312. During the readout time, a readout transfer control signal RTX is asserted. As illustrated in FIG. 3, the readout transfer control signal RTX is applied to the gate terminal of the readout transfer transistor 314. When the readout transfer control signal RTX is asserted, the readout transfer transistor 314 is made conductive and the charge stored in the storage diode 312 is transferred to the floating diffusion 316. The readout transfer control signal RTX is then de-asserted to turn off the readout transfer transistor 314. Next, a row select control signal RS is asserted during the readout time. As illustrated in FIG. 3, the row select control signal RS is applied to the gate terminal of the row select transistor 322. When the row select control signal RS is asserted, the row select transistor 322 is made conductive and outputs an output signal Vout that is representative of the magnitude of charge stored in the floating diffusion 316. The output signal Vout is one example of a "pixel signal." When the row select control signal RS is asserted, one of the column lines 222 can be used to route the output signal Vout to readout circuitry, such as the column controller 218 in FIG. 2.

As illustrated in FIG. 4, each of the pixels 212 in the pixel array 210 captures an image simultaneously during the integration time. As also illustrated in FIG. 4, frame transfer occurs in each of the pixels 212 in the pixel array 210 at the same time. However, some of the pixels in the pixel array 210 are read out later than others because the pixel array 210 is read out row by row. Thus, while a pixel is waiting to be read out, the storage diode 312 in that pixel may collect unwanted charge from light leakage. For example, light from a moving scene may impact the global shutter image sensor 106 at a steep angle of incidence and may leak into the storage diode 312. Ghost or motion artifacts may be observed in generated images as a result of light leakage in the storage diode 312 (sometime referred to as parasitic leakage).

Figure 5:
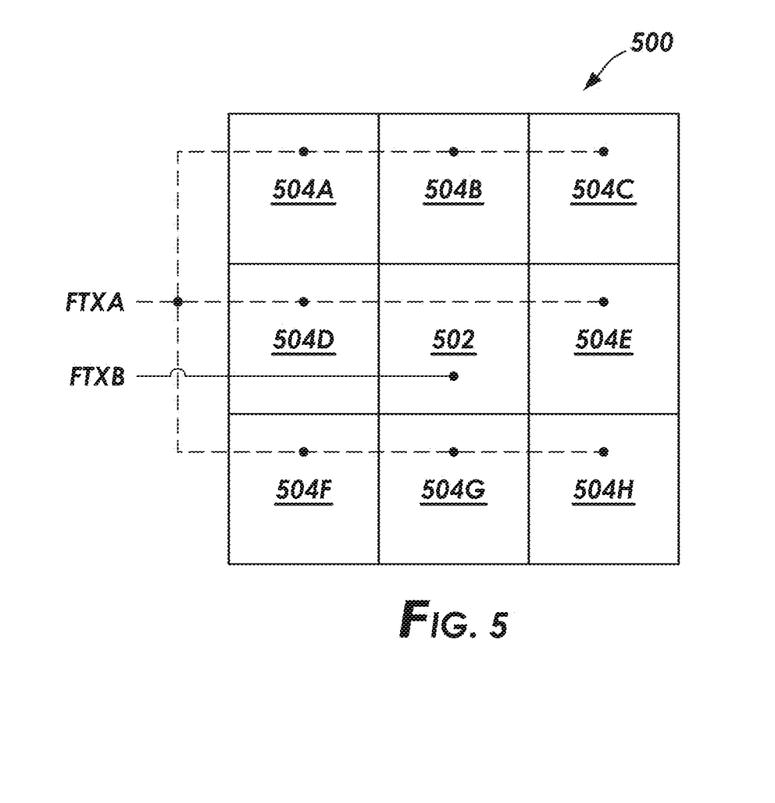
FIG. 5 is an overhead view of an example of a pixel group in a global shutter image sensor in accordance with some implementations.

The effects of parasitic leakage may be addressed by determining the amount of parasitic leakage in the pixel array 210. To that end, some of the pixels 212 in the pixel array 210 may be configured to determine the amount of parasitic leakage in the storage diode 312. FIG. 5 shows an overhead view of an example of a pixel group 500 of pixels included in the pixel array 210. The pixel group 500 illustrated in FIG. 5 includes a correction pixel 502 and a plurality of image pixels 504A through 504H positioned around the correction pixel 502. Each of the dots illustrated in each of the plurality of image pixels 504A through 504H in FIG. 5 represents a connection to the gate terminal of the frame transfer transistor 310 in each of the plurality of image pixels 504A through 504H. Thus, as illustrated in FIG. 5, the frame transfer transistor 310 in each of the plurality of image pixels 504A through 504H is coupled to receive a first frame transfer control signal FTXA. Further, the dot illustrated in the correction pixel 502 of FIG. 5 represents a connection to the gate terminal of the frame transfer transistor 310 in the correction pixel 502. Thus, as illustrated in FIG. 5, the frame transfer transistor 310 in the correction pixel 502 is coupled to receive a second frame transfer control signal FTXB.

Figure 6:
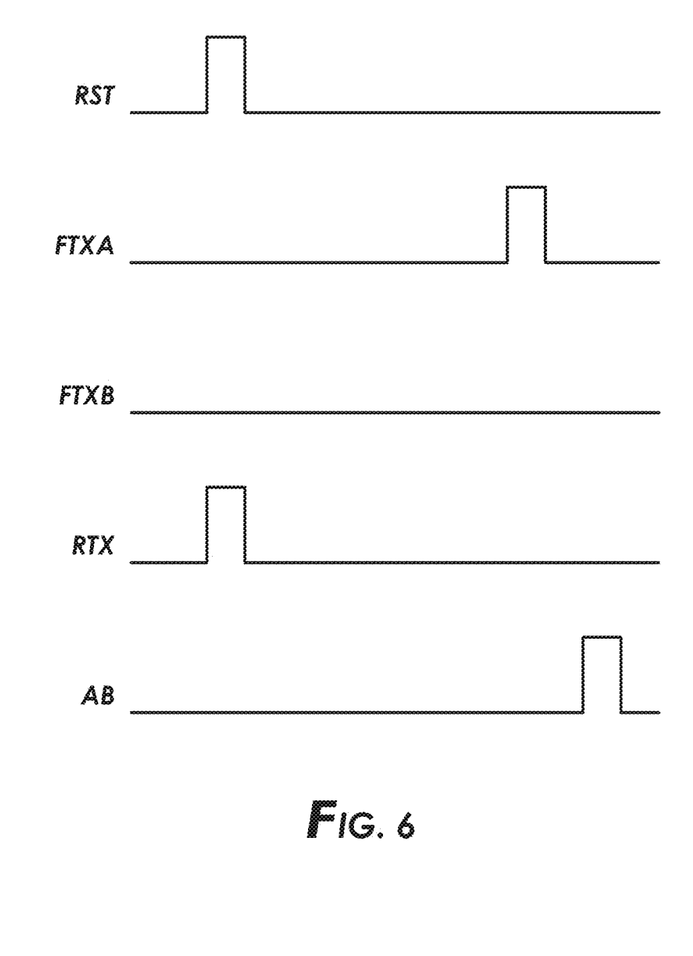
FIG. 6 is a signal timing diagram of an example of a frame transfer time of the global shutter image sensor of FIG. 2 in accordance with some implementations.

FIG. 6 is a signal timing diagram of an example of a frame transfer time of the global shutter image sensor 106. In some implementations, as illustrated in FIG. 6, the readout transfer control signal RTX and a reset control signal RST are asserted at the start of the frame transfer time. As described above, when the readout transfer control signal RTX is asserted, the readout transfer transistor 314 is made conductive. As illustrated in FIG. 3, the reset control signal RST is applied to the gate terminal of the reset transistor 318. Thus, when the reset control signal RST is asserted, the reset transistor 318 is made conductive. Making the readout transfer transistor 314 and the reset transistor 318 conductive at the same time resets the storage diode 312 and the floating diffusion 316 to a voltage equal or close to the supply voltage Vdd. Returning to FIG. 6, the readout transfer control signal RTX and the reset control signal RST are then de-asserted to turn off the readout transfer transistor 314 and the reset transistor 318, respectively. In some implementations, instead of being asserted during the frame transfer time, the readout transfer control signal RTX and the reset control signal RST are asserted during the readout time after the pixel signal is read out.

Next, the first frame transfer control signal FTXA is asserted. As described above, the first frame transfer control signal FTXA is applied to the gate terminal of the frame transfer transistor 310 in each of the plurality of image pixels 504A through 504H. When the first frame transfer control signal FTXA is asserted, the frame transfer transistor 310 in each of the plurality of image pixels 504A through 504H is made conductive to transfer charge generated by the photodetector 306 in response to incoming light to the storage diode 312. The first frame transfer control signal FTXA is then de-asserted to turn off the frame transfer transistor 310 in each of the plurality of image pixels 504A through 504H. As illustrated in FIG. 6, the second frame transfer control signal FTXB is not asserted during the frame transfer time. Thus, charge generated by the photodetector 306 in response to incoming light is not transferred to the storage diode 312 in the correction pixel 502.

Next, in some implementations, as illustrated in FIG. 6, an anti-blooming control signal AB is asserted to set the photodetector 306 to an anti-bloom state to reduce blooming. As illustrated in FIG. 3, the anti-blooming control signal AB is applied to the gate terminal of the anti-blooming transistor 308. When the anti-blooming control signal AB is asserted, the anti-blooming transistor 308 is made conductive to set the photodetector 306 to a voltage equal or close to the supply voltage Vdd. The anti-blooming control signal AB is then de-asserted to turn off the anti-blooming transistor 308.

As described above, readout from the pixel array 210 occurs row wise. Thus, the readouts from the plurality of image pixels 504A through 504H may include charge generated in the photodetector 306 in response to incident light as well as charge generated by parasitic leakage in the storage diode 312. However, as described above, charge generated by the photodetector 306 in response to incoming light is not transferred to the storage diode 312 in the correction pixel 502. Thus, a readout from the correction pixel 502 represents only the amount of parasitic leakage that occurs in the storage diode 312. As described in more detail below, the readout from the correction pixel 502 may be used to adjust the readouts from the plurality of image pixels 504A through 504H to account for parasitic leakage in the storage diode 312.

Figure 7:
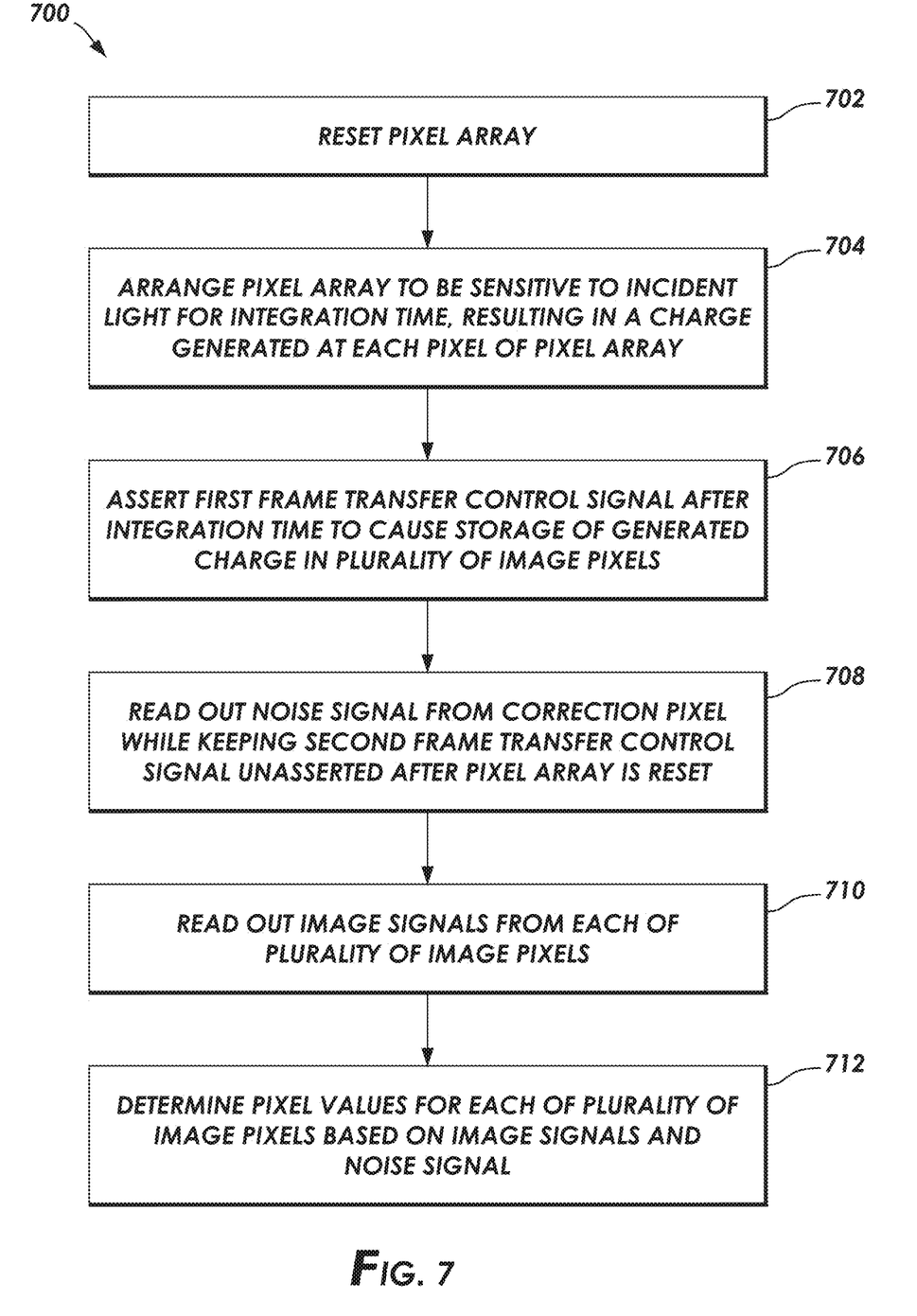
FIG. 7 is a flow diagram of an example of a method for global shutter imaging with parasitic leakage correction in accordance with some implementations.

FIG. 7 is a flow diagram of an example of a method 700 for global shutter imaging with parasitic leakage correction in accordance with some implementations. For simplicity of explanation, the method 700 is depicted in FIG. 7 and described below as a series of operations. However, the operations can occur in various orders and/or concurrently, and/or with other operations not presented and described herein. Further, for ease of explanation, the method 700 is depicted in FIG. 7 and described in relation to the pixel group 500 illustrated in FIG. 5. However, the operations of the method 700 can occur simultaneously or concurrently in multiple instances of pixel groups across the pixel array 210. At block 702, the pixel array 210 is reset. For example, the anti-blooming control signal AB may be asserted to set the photodetector 306 to an anti-bloom state. As described above, when the anti-blooming control signal AB is asserted, the anti-blooming transistor 308 in the correction pixel 502 and each of the plurality of image pixels 504A through 504H is made conductive to set the photodetector 306 in the correction pixel 502 and each of the plurality of image pixels 504A through 504H to a voltage equal or close to the supply voltage Vdd.

At block 704, the pixel array 210 is arranged to be sensitive to incident light for an integration time, resulting in a charge generated at each pixel of the pixel array 210. During the integration time, the photodetector 306 in the correction pixel 502 and in each of the plurality of image pixels 504A through 504H generates charge in response to the incident light. In some implementations, the pixel array 210 may be arranged to be sensitive to incident light by opening a mechanical shutter of the imaging system 100 to permit the pixel array 210 to receive incident light. Alternatively, or in addition, the pixel array 210 may be arranged to be sensitive to incident light by turning off the anti-blooming transistor 308 in the correction pixel 502 and each of the plurality of image pixels 504A through 504H.

At block 706, the first frame transfer control signal FTXA is asserted after the integration time to cause storage of generated charge in plurality of image pixels. As described above, when the first frame transfer control signal FTXA is asserted, the frame transfer transistor 310 in each of the plurality of image pixels 504A through 504H is made conductive to transfer charge generated by the photodetector 306 in response to incoming light to the storage diode 312.

At block 708, a noise signal is read out from the correction pixel 502 while keeping the second frame transfer control signal FTXB unasserted after the pixel array 210 is reset. Because the second frame transfer control signal FTXB is not asserted after the pixel array 210 is reset, charge generated by the photodetector 306 in the correction pixel 502 is not transferred to the storage diode 312 in the correction pixel 502. Thus, the noise signal read out from the correction pixel 502 represents only the amount of parasitic leakage that occurred in the storage diode 312 of the correction pixel 502 while the correction pixel 502 was waiting to be read out.

At block 710, image signals from each of the plurality of image pixels 504A through 504H are read out. Each of the image signals represents the amount of charge generated by the photodetector 306 in one of the plurality of image pixels 504A through 504H during the integration time as well as the amount of parasitic leakage that occurred in the storage diode 312. For example, the image signal read out from image pixel 504F represents the amount of charge generated by the photodetector 306 in image pixel 504F during the integration time as well as the amount of parasitic leakage that occurred in the storage diode 312 of the image pixel 504F while the image pixel 504F was waiting to be read out. In some implementations, the block 708 and block 710 occur concurrently.

At block 712, pixel values for each of the plurality of image pixels 504A through 504H are determined based on the image signals and the noise signal. Because the plurality of image pixels 504A through 504H are positioned around the correction pixel 502, the amount of parasitic leakage that occurs in the correction pixel 502 is equal or substantially close to the amounts of parasitic leakage that occur in each of the plurality of image pixels 504A through 504H. Thus, the noise signal read out from the correction pixel 502 may be subtracted from the image signals read out from the plurality of image pixels 504A through 504H to determine pixel values for the plurality of image pixels 504A through 504H. Each of the determined pixel values substantially represents only the amount of charge generated by the photodetector 306 in the one of the plurality of image pixels 504A through 504H during the integration time. For example, a pixel value for image pixel 504A may be determined using Equation 1 shown below:

$$P_V(1) = P_S(1) - P_S(c) \qquad \text{Equation 1}$$

wherein:
- $P_V(1)$=pixel value for image pixel 504A,
- $P_S(1)$=image signal read out from image pixel 504A, and
- $P_C(c)$=noise signal read out from correction pixel 502.

A pixel value for the correction pixel 502 may be determined based on the pixel signals of all eight of the plurality of image pixels 504A through 504H. In some implementations, the pixel value for the correction pixel 502 may be determined as the mean or median of the pixel values of all eight of the plurality of image pixels 504A through 504H. For example, the pixel value for the correction pixel 502 may be determined as the mean of the pixel values of all eight of the plurality of image pixels 504A through 504H using Equation 2 shown below:

$$P_V(c) = \frac{P_V(1) + P_V(2) + P_V(3) + P_V(4) + P_V(5) + P_V(6) + P_V(7) + P_V(8)}{8} \qquad \text{Equation 2}$$

wherein:
- $P_V(c)$=pixel value for correction pixel 502,
- $P_V(1)$=pixel value for image pixel 504A,
- $P_V(2)$=pixel value for image pixel 504B,
- $P_V(3)$=pixel value for image pixel 504C,
- $P_V(4)$=pixel value for image pixel 504D,
- $P_V(5)$=pixel value for image pixel 504E,
- $P_V(6)$=pixel value for image pixel 504F,
- $P_V(7)$=pixel value for image pixel 504G, and
- $P_V(8)$=pixel value for image pixel 504H.

A pixel value for the correction pixel 502 may also be determined based on the pixel signals of a subset of the plurality of image pixels 504A through 504H in order to preserve an edge in the image. For example, in some scenes, determining a pixel value for the correction pixel 502 by averaging the pixel values for each of the plurality of image pixels 504A through 504H may result in blurring lines in an image. Thus, the image sensor controller 214 (or the imaging controller 108) may detect edges in an image based on the pixel values for each of the plurality of image pixels 504A through 504H. Further, the image sensor controller 214 (or the imaging controller 108) may select and use pixel values for two of the plurality of image pixels 504A through 504H to preserve detected edges. In some implementations, to preserve a horizontal line, the pixel value for the correction pixel 502 may be determined based on the pixel values of the pixels that are positioned next to the correction pixel 502 on the same row as the correction pixel 502. For example, the pixel value for the correction pixel 502 may be determined as the median of the pixel values of image pixels 504D and 504E using Equation 3 shown below:

$$P_V(c) = (P_V(4) + P_V(5))/2 \qquad \text{Equation 3}$$

wherein:
- $P_V(c)$=pixel value for correction pixel 502,
- $P_V(4)$=pixel value for image pixel 504D, and
- $P_V(5)$=pixel value for image pixel 504E.

Alternatively, or in addition, to preserve a vertical line, the pixel value for the correction pixel 502 may be determined based on the pixel values of the two pixels that are positioned next to the correction pixel 502 in the rows above and below the correction pixel 502. For example, the pixel value for the correction pixel 502 may be determined as the median of the pixel values of image pixels 504B and 504G using Equation 4 shown below:

$$P_V(c)=(P_V(2)+P_V(7))/2 \quad \text{Equation 4}$$

wherein:
P$_V$(c)=pixel value for correction pixel 502,
P$_V$(2)=pixel value for image pixel 504B, and
P$_V$(7)=pixel value for image pixel 504G.

Alternatively, or in addition, to preserve a diagonal line, the pixel value for the correction pixel 502 may be determined using of the pixel values of two pixels positioned diagonally adjacent to the correction pixel 502. For example, the pixel value for the correction pixel 502 may be determined as the median of the pixel values of image pixels 504A and 504H using Equation 5 shown below:

$$P_V(c)=(P_V(1)+P_V(8))/2 \quad \text{Equation 5}$$

wherein:
P$_V$(c)=pixel value for correction pixel 502,
P$_V$(1)=pixel value for image pixel 504A, and
P$_V$(8)=pixel value for image pixel 504H.

As a further example, the pixel value for the correction pixel 502 may be determined as the median of the pixel values of image pixels 504C and 504F using Equation 6 shown below:

$$P_V(c)=(P_V(3)+P_V(6))/2 \quad \text{Equation 6}$$

wherein:
P$_V$(c)=pixel value for correction pixel 502,
P$_V$(1)=pixel value for image pixel 504C, and
P$_V$(6)=pixel value for image pixel 504F.

In additional to the methods for preserving horizontal, vertical, and diagonal lines described above, the pixel value for the correction pixel 502 may be determined using any edge detection functions.

Figure 8:
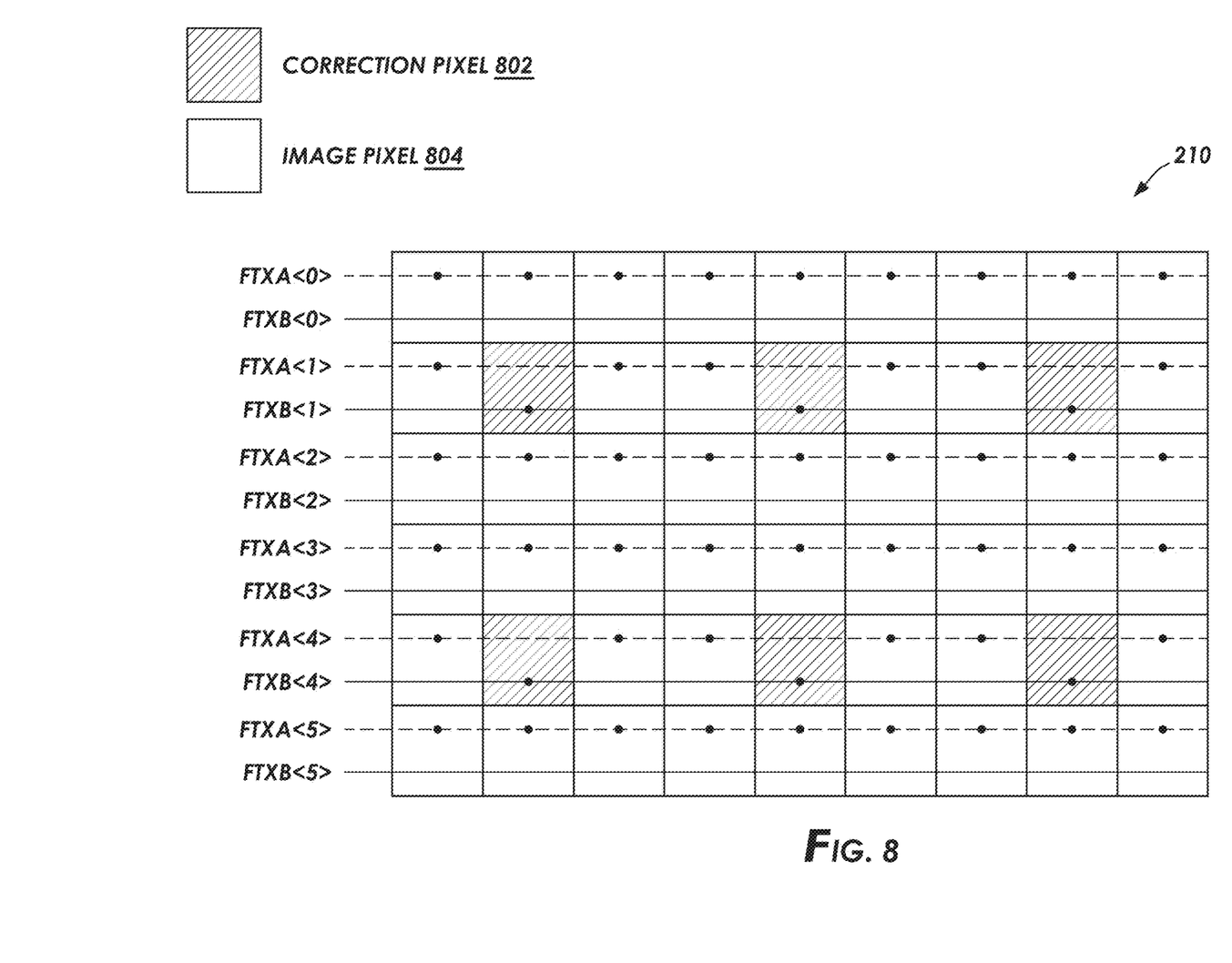
FIG. 8 is an overhead view of an example of a pixel array divided into a plurality of pixel groups in accordance with some implementations.

FIG. 8 shows an overhead view of an example of the pixel array 210 divided into three-by-three pixel groups. For simplicity of explanation, the pixel array 210 is depicted in FIG. 8 as including six rows. However, the pixel array 210 can include more than six rows or less than six rows. Similar to FIG. 5, each of the pixel groups in FIG. 8 include a correction pixel 802 and a plurality of image pixels 804 positioned around the correction pixel 804. Further, each of the dots illustrated in each of the image pixels 804 in FIG. 8 represents a connection to the gate terminal of the frame transfer transistor 310 in each of image pixels 804. In addition, each of the dots illustrated in each of the correction pixels 802 in FIG. 8 represents a connection to the gate terminal of the frame transfer transistor 310 in each of the correction pixels 802. As illustrated in FIG. 8, two different row drivers are used to control the frame transfer transistor 310 in the pixels in each row. In some implementations, the row driver for the correction pixels 802 in a row may be selectively configured to operate similar to the row driver for the image pixels 804. For example, the second frame transfer control signal FTXB may be temporarily switched to match the first frame transfer control signal FTXA. In this manner, the correction pixels 802 may operate as the image pixels 804 when parasitic leakage correction in not needed or desired. Further, no extra circuits are needed in the pixel array 210 to operate the correction pixels 802 and the image pixels 804.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A global shutter image sensor, comprising:
a pixel array including a correction pixel and a plurality of image pixels positioned around the correction pixel, wherein the correction pixel and each of the plurality of image pixels includes:
a photodetector configured to accumulate charge in response to incident light,
a storage diode, and
a frame transfer transistor coupled between the photodetector and the storage diode;
a first row driver coupled to the frame transfer transistor in each of the plurality of image pixels; and
a second row driver coupled to the frame transfer transistor in the correction pixel.

2. The global shutter image sensor of claim 1, further comprising a controller configured to:
reset the pixel array,
arrange the pixel array to be sensitive to the incident light for an integration time,
cause the first row driver to output a first frame transfer control signal to a gate terminal of the frame transfer transistor in each of the plurality of image pixels after the integration time,
read out a noise signal from the correction pixel while keeping the second row driver from outputting a second frame transfer control signal to the gate terminal of the frame transfer transistor in the correction pixel after the pixel array is reset,
read out image signals from each of the plurality of image pixels, and
determine pixel values for each of the plurality of image pixels based on the image signals and the noise signal.

3. The global shutter image sensor of claim 2, wherein the correction pixel and each of the plurality of image pixels further including an anti-blooming transistor coupled between the photodetector and a positive power supply terminal, wherein the anti-blooming transistor is made conductive when an anti-blooming control signal is asserted, and wherein, to reset the pixel array, the controller is further configured to assert the anti-blooming control signal.

4. The global shutter image sensor of claim 2, wherein the correction pixel and each of the plurality of image pixels further including:
a floating diffusion,
a readout transfer transistor coupled between the storage diode and the floating diffusion, wherein the readout transfer transistor is made conductive when a readout transfer control signal is asserted, and
a reset transistor coupled between the floating diffusion and a positive power supply terminal, wherein the reset transistor is made conductive when a reset control signal is asserted,
wherein the controller is further configured to assert the readout transfer control signal and the reset control signal after the integration time and before generating the first frame transfer control signal.

5. The global shutter image sensor of claim 2, wherein the controller is further configured to determine an image signal for the correction pixel based on the image signals for each of the plurality of image pixels.

6. The global shutter image sensor of claim 2, wherein the controller is further configured to:
 detect an edge based on the pixel values for each of the plurality of image pixels,
 select two of the plurality of image pixels based on the edge, and
 determine a pixel value for the correction pixel based on the pixel values for the two of the plurality of image pixels.

7. The global shutter image sensor of claim 6, wherein the two of the plurality of image pixels are positioned at least one selected from the group consisting of horizontally adjacent to the correction pixel, vertically adjacent to the correction pixel, and diagonally adjacent to the correction pixel.

8. An imaging system, comprising:
 a lens system;
 a global shutter image sensor in operational relationship with the lens system, wherein the global shutter image sensor comprises a pixel array including a correction pixel and a plurality of image pixels; and
 an imaging controller configured to:
  reset the pixel array,
  arrange the pixel array to be sensitive to incident light for an integration time, resulting in a charge generated at each pixel of the pixel array,
  generate a first frame transfer control signal after the integration time to cause storage of the generated charge in the plurality of image pixels,
  read out a noise signal from the correction pixel while keeping a second frame transfer control signal unasserted after the pixel array is reset, wherein assertion of the second frame transfer control signal causes storage of the generated charge in the correction pixel,
  read out image signals from each of the plurality of image pixels, and
  determine pixel values for each of the plurality of image pixels based on the image signals and the noise signal.

9. The imaging system of claim 8, wherein the correction pixel and each of the plurality of image pixels includes an anti-blooming transistor that is made conductive when an anti-blooming control signal is asserted, and wherein, to reset the pixel array, the imaging controller is further configured to assert the anti-blooming control signal.

10. The imaging system of claim 9, wherein the imaging controller is further configured to assert the anti-blooming control signal after generating the first frame transfer control signal and before reading out the image signals from each of the plurality of image pixels.

11. The imaging system of claim 8, wherein the correction pixel and each of the plurality of image pixels further including:
 a floating diffusion,
 a readout transfer transistor coupled between the storage diode and the floating diffusion, wherein the readout transfer transistor is made conductive when a readout transfer control signal is asserted, and
 a reset transistor coupled between the floating diffusion and a positive power supply terminal, wherein the reset transistor is made conductive when a reset control signal is asserted,
 wherein the imaging controller is further configured to assert the readout transfer control signal and the reset control signal after the integration time and before generating the first frame transfer control signal.

12. The imaging system of claim 8, wherein the imaging controller is further configured to determine an image signal for the correction pixel based on the image signals for each of the plurality of image pixels.

13. The imaging system of claim 8, wherein the imaging controller is further configured to:
 detect an edge based on the pixel values for each of the plurality of image pixels,
 select two of the plurality of image pixels based on the edge, and
 determine a pixel value for the correction pixel based on the pixel values for the two of the plurality of image pixels.

14. The imaging system of claim 13, wherein the two of the plurality of image pixels are positioned at least one selected from the group consisting of horizontally adjacent to the correction pixel, vertically adjacent to the correction pixel, and diagonally adjacent to the correction pixel.

15. The imaging system of claim 8, wherein the imaging system is included in at least one selected from the group consisting of an automobile, a vehicle, a camera, a cellular telephone, a tablet computing, a webcam, a video camera, a video surveillance system, and a video gaming system.

16. A method for operating a global shutter image sensor comprising a correction pixel and a plurality of image pixels positioned around the correction pixel in a pixel array, the method comprising:
 resetting the pixel array;
 arranging the pixel array to be sensitive to incident light for an integration time, resulting in a charge generated at each pixel of the pixel array;
 asserting a first frame transfer control signal after the integration time to cause storage of the generated charge in the plurality of image pixels;
 reading out a noise signal from the correction pixel while keeping a second frame transfer control signal unasserted after the pixel array is reset, wherein assertion of the second frame transfer control signal causes storage of the generated charge in the correction pixel;
 reading out image signals from each of the plurality of image pixels; and
 determining pixel values for each of the plurality of image pixels based on the image signals and the noise signal.

17. The method of claim 16, wherein resetting the pixel array further includes asserting an anti-blooming control signal to reset each photodetector in the pixel array.

18. The method of claim 17, further comprising:
 asserting the anti-blooming control signal after generating the first frame transfer control signal and before reading out the image signals from each of the plurality of image pixels.

19. The method of claim 16, further comprising:
 determining an image signal for the correction pixel based on the image signals for each of the plurality of image pixels.

20. The method of claim 16, further comprising:
 detecting an edge based on the pixel values for each of the plurality of image pixels;
 selecting two of the plurality of image pixels based on the edge; and determining a pixel value for the correction pixel based on the pixel values for the two of the plurality of image pixels.

\* \* \* \* \*